Figure 1:
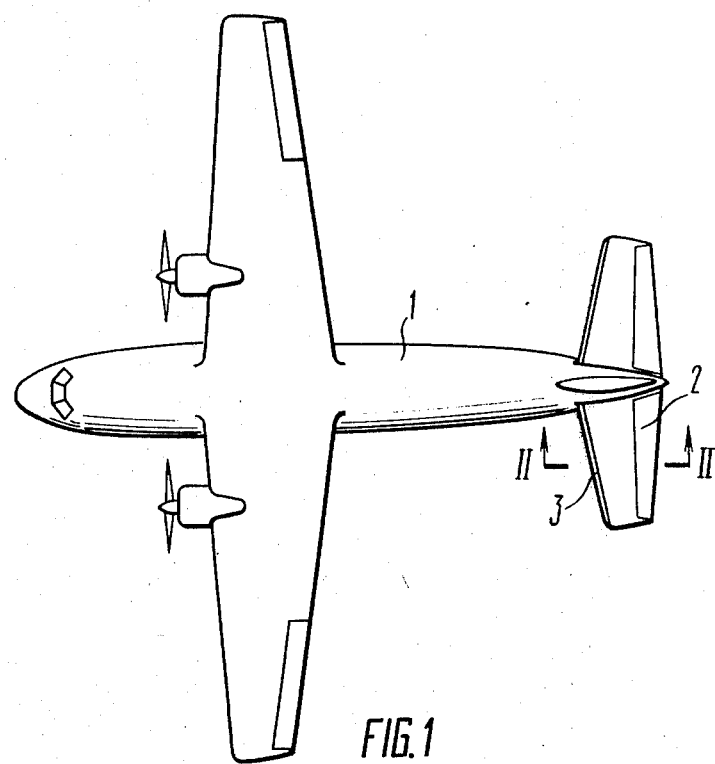

United States Patent [19]

Antonov

[11] 4,358,075
[45] Nov. 9, 1982

[54] ANTI-ICING DEVICE FOR AERODYNAMIC STRUCTURES OF AIRCRAFT

[76] Inventor: Oleg K. Antonov, ulitsa Ogareva, 1, Kiev, U.S.S.R.

[21] Appl. No.: 853,307

[22] Filed: Nov. 18, 1977

Related U.S. Application Data

[63] Continuation of Ser. No. 697,254, Jun. 17, 1976, abandoned.

[51] Int. Cl.³ .............................................. B64D 15/02
[52] U.S. Cl. ................................ 244/134 R; 244/210; 244/214
[58] Field of Search ............... 244/210, 204, 214, 134, 244/198, 13, 207

[56] References Cited

U.S. PATENT DOCUMENTS

| | | | |
|---|---|---|---|
| 1,887,148 | 11/1932 | Ganahl | 244/134 C |
| 2,066,336 | 1/1937 | Crouch et al. | 244/214 |
| 2,328,079 | 8/1943 | Goodman | 244/134 B |
| 2,427,972 | 9/1947 | Melchior | 244/207 |
| 2,447,095 | 8/1948 | Schmidt | 244/134 B |
| 3,575,363 | 4/1971 | Jenny | 244/13 |
| 3,917,193 | 11/1975 | Runnels | 244/134 B |

*Primary Examiner*—Galen L. Barefoot
*Attorney, Agent, or Firm*—McAulay, Fields, Fisher, Goldstein & Nissen

[57] ABSTRACT

To prevent deposition of ice on the frontal surface of for instance, the horizontal tail of aircraft anti-icing member is installed in front of the edge along its entire length. The member has an airfoil profile with a chord equal to 3–8% of that of the tail to be protected and is located in a zone not exceeding the tail is thickness, a duct being formed between the member and the surface to be protected for the passage of an accelerated air stream.

6 Claims, 2 Drawing Figures

ANTI-ICING DEVICE FOR AERODYNAMIC STRUCTURES OF AIRCRAFT

CROSS-RELATED APPLICATION

This application is a continuation of Ser. No. 697,254 filed June 17, 1976 now abandoned.

The present invention relates to aviation, and in particular to aircraft fore-and-aft trim means. More specifically, it relates to anti-icing devices for aerodynamic structures of aircraft.

Icing, especially that of the horizontal tail, presents one of the most serious dangers for aircraft.

Known in the art are constructions of the horizontal tail including a power unit, a leading edge, and suspension attachments (cf. "AN-24 Aircraft, Service Manual", Volume II, p. 45, "Machine Building" Publishers, 1971).

To protect the horizontal tail from icing, its leading edge is heated by hot air supplied to its internal skin through suitable ducts. The heating is turned on by the pilot. Also known are anti-icing systems actuated automatically upon the command of an ice detector (cf. U.S. Pat. No. 3,058,305).

The known anti-icing systems, however, are not sufficiently reliable because where the system is operated manually, the pilot may forget to switch it on, and where it is controlled automatically, failures may occur. In practice, failures in anti-icing systems are caused by a variety of factors, often unpredictable ones.

A disadvantage of all these systems is their inadequate dependability and, as a result, low safety in flight.

There is known an aircraft horizontal tail with a leading-edge slat (cf. U.S. Pat. No. 3,575,363).

This slat is designed to increase the pitch control and stabilizing forces provided by the horizontal tail. It defines an aerodynamic structure adjacent to the tail's profile in flight so as to form one airfoil therewith, and extended outwardly during take-off and landing.

The slat's chord equals 10-17% of the wing's chord (cf. "TSAGI Technical Reports" No. 4 pp. 7, 23).

Such a slat has a great aerodynamic drag in the extended position, and complex mechanisms to operate the slat also affect flight safety, since failures in these mechanisms are possible.

There are also known de-icing devices for aircraft such as, for instance, disclosed in U.S. Pat. No. 3,356,321, filed on Oct. 21, 1965. In the patented device, the aerodynamic structure is made solid with a well defined portion of a substantially circular section on its leading edge, this portion housing circuits of a heating device. Thus, the structure to be protected is similar in cross section to a blade with a bulging circular leading edge. Here, some decrease in thickness of the structure from the leading edge back to the trailing edge is essential for the operation of the device.

A disadvantage of this device is its insufficient reliability because here special manually or automatically operated systems for actuating ice-protection units are necessary. In practice, failures in these systems take place, which may result in a crash if the aircraft flies under icing conditions.

In addition, special attention should be paid to such systems in maintenance.

Moreover, the leading edge of the aerodynamic structure according to the U.S. Pat. No. 3,356,321 needs to be made to a special shape, which deteriorates the aerodynamic properties of the structure.

An object of the present invention is to provide an anti-icing device which guarantees the removal of ice from an aerodynamic structure regardless of such factors as timely action of the pilot or performance reliability of the heating system.

Another object of the invention is to provide an anti-icing device which ensures high safety in flight and, at the same time, retains the required aerodynamic properties of aircraft units without the necessity of change in the geometry and manufacture of the aerodynamic structures to be protected, for instance, the aircraft horizontal tail.

Still another object of the invention is to provide a device that reliably protects an aircraft aerodynamic structure independently of the continuous action of the heating system components, their location, and sequence of operation.

A further object of the invention is to provide such an anti-icing device that properly operates without any heating system.

And finally, an object of the invention is to provide a device that prevents deposition of ice on vital portions of aircraft aerodynamic structures, which device is relatively simple in design and inexpensive in manufacture and maintenance.

With these and other objects in view, in accordance with the present invention, there is provided an anti-icing device for an aerodynamic structure of aircraft, in particular an aircraft horizontal tail. The device features an anti-icing member installed along the frontal surface of the tail to be protected and defining an airfoil profile in its cross section, the anti-icing member being located in front of the tail to be protected in a zone not exceeding the thickness of the tail and at a distance from the frontal surface thereof along its whole length so that the frontal surface of the tail and the back surface of the anti-icing member define a duct for the passage of an accelerated air stream around the aerodynamic structure to be protected.

Such a design allows an accelerated air stream to be obtained which vigorously flows around the aerodynamic surface to be protected. In this case, even if ice is formed, it will be deposited on the narrow leading edge of the anti-icing member, and this cannot substantially impair the function of the main aerodynamic structure. Moreover, no considerable volume of ice can accumulate on the narrow edge of the anti-icing member, and ice particles will break away in flight. It should be noted that the anti-icing device reliably prevents icing and makes for safer flight even without the use of any heating system that requires, as a rule, special attention of the pilot and appropriate conditions for trouble-free operation.

According to another embodiment of the invention, there is provided an anti-icing device wherein the anti-icing member has a profile with a chord equal to 3-8% of the chord of the tail to be protected, the anti-icing member being located in front and below the tail at an angle of 30°-60° to the tail chord plane and at a distance equal to 1-3% of its chord in front of the tail's frontal portion.

This embodiment of the invention determines optimum geometry and relationship between dimensions of the anti-icing device, which makes safe flight possible in icing conditions without considerable deterioration of the aircraft's aerodynamic properties.

Figure 2:
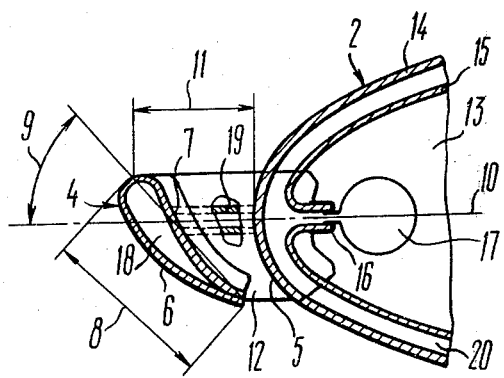

The invention will now be described in more detail, by way of example, with reference to the accompanying drawings in which:

FIG. 1 is a top plan view of an aircraft having a horizontal tail provided with an anti-icing device according to the present invention; and FIG. 2 is a sectional view taken along line II—II of FIG. 1.

An aircraft 1 (FIG. 1) incorporates a horizontal tail 2 provided with an anti-icing device 3. The device 3 has an anti-icing member 4 (FIG. 2) installed in front of and below a frontal surface 5 of the tail to be protected. The anti-icing member 4 defines an airfoil profile in cross section with a frontal surface 6, a back surface 7, and a chord 8. The chord 8 of the anti-icing member 4 is selected to be 3-8% of the chord of the tail to be protected. The member 4 is located at an angle 9 to the chord plane 10 of the tail 2 to be protected, which is taken equal to 30°-60°, and at a distance 11 from the tail that is 1-3% of the tail chord.

The anti-icing member 4 is secured to the tail 2 with the aid of brackets 12.

The frontal part of the tail 4 is provided with ribs 13 and a skin 14. Mounted inside the skin 14 are covers 15 associated through seals 16 with a hot-air delivery duct 17 connected to the source of hot air (not shown).

The anti-icing member is made hollow with a chamber 18 which is connected through pipes 19, mounted in the brackets 12, to another chamber 20, formed by the skin 14 and the covers 15.

When the aircraft passes through an icing area, the heating system is put into operation either by the pilot or automatically. Hot air from the source is directed to the air-delivery duct 17, and from the latter, to the chambers 20 and 18, thus heating the tail skin 14 and the anti-icing member 4.

In this case, optimum conditions for aircraft stability control are ensured because no icing of the tail takes place.

If the anti-icing heat system does not function in icing conditions, the anti-icing member 4 becomes a side of intense icing. However, the horizontal tail proper is prevented from icing. The passage between the anti-icing member 4 and the frontal surface 5 of the horizontal tail 2 causes an air stream flow around the main profile, and thereby, acceptable stability and control characteristics are provided.

A relatively small area of additional aerodynamic structure may be suitably heated by electricity, hot air, or any other known method.

With the chord length of the anti-icing member 4 being selected equal to 3-8% that of the tail 2 to be protected, the use of the member does not involve any perceptible rise in aerodynamic drag. At the same time, the anti-icing member with such a chord 8 provides adequate protection to the tail. In addition, the location of the anti-icing member at an angle of 30°-60° to the chord plane of the tail to be protected, and at a distance equal to 1-3% of its chord in front of and below its frontal surface, makes for an effective protection of the tail over the whole of its angle of attack in icing conditions while adequately retaining the stability and control characteristics for the continuation of flight or performance of take-off or landing even if the anti-icing systems (heating, mechanical, etc.) do not function.

The use of such a device in combination with known anti-icing systems, for instance heating systems, ensures complete safety of flight in icing conditions and rules out aircraft accidents due to icing of the tail.

Moreover, the device may be used without anti-icing systems (heating, mechanical and other types) on, for instance, light airplanes and gliders where cumbersome anti-icing systems are not justifiable in respect to their weight and cost.

In this case, the device guarantees safe flight at a minimum increase in weight of the aircraft or glider, and minimum maintenance costs.

Besides, it is very advantageous that the tail to be protected retains a conventional airfoil profile on its frontal portion, and the anti-icing member is made to have an airfoil profile in cross section whose back surface, together with the frontal surface of the tail to be protected, form a duct for the passage of an accelerated air stream around the tail's surface being protected.

When the aircraft flies through an icing area, ice is formed on the leading edge of the anti-icing member wherefrom it is thrown away by the incoming air stream as it accumulates to a certain thickness, while the accelerated air stream around the supporting surface of the tail prevents considerable ice accretion thereon.

Thus the stability and control characteristics of the aircraft remain acceptable even where anti-icing systems do not operate, which allows safe take-off and landing in icing conditions.

What is claimed is:

1. An improved anti-icing apparatus for preventing ice formation on the aerodynamic surface of an aircraft, in particular a horizontal tail, said apparatus having an elongated anti-icing member installed in front of the tail being protected, in a zone not exceeding the thickness of the tail at a distance from a conventional frontal surface of the tail, along the whole length thereof, and along the frontal surface, the tail retaining its conventional airfoil profile in its frontal portion, said improvement comprising: defining said anti-icing member by an airfoil profile in its cross section, the distance between the tip of the anti-icing member and the frontal surface of the tail being equal to 1-3% of the chord of the tail, the frontal surface and a back surface of said anti-icing member defining a duct for the passage of an accelerated air stream around the frontal surface of the tail being protected, said anti-icing member having a profile with a chord equal to 3-8% of the chord of the tail being protected, said anti-icing member being located in front of the tail at an angle of 30°-60° to the tail chord plane.

2. An improved anti-icing apparatus as claimed in claim 1, wherein: said anti-icing member is provided with a cavity, said tail having a peripheral duct formed beneath the skin, said cavity and duct being in communication and being supplied with heated air.

3. An improved anti-icing apparatus as claimed in claim 2, comprising: means in said tail for supplying heated air to said peripheral duct.

4. An improved anti-icing apparatus as claimed in claim 3, comprising: conduit means for conveying heated air from said peripheral duct in the tail to said cavity in the anti-icing member.

5. An improved anti-icing apparatus as claimed in claim 1, wherein: said duct for the passage of the air stream between the anti-icing member and the tail is reduced in section in downwardly direction.

6. An improved anti-icing apparatus as claimed in claim 5, wherein: the major portion of the anti-icing member extends below the tail chord plane.

* * * * *